United States Patent [19]
Bergner

[11] Patent Number: 5,511,124
[45] Date of Patent: Apr. 23, 1996

[54] CRYPTOGRAPHIC EQUIPMENT

[75] Inventor: Peter Bergner, Oberschleissheim, Germany

[73] Assignee: Siemens Aktiengesellschaft, Munich, Germany

[21] Appl. No.: 566,818

[22] Filed: Jul. 19, 1990

[30] Foreign Application Priority Data

Jul. 20, 1989 [DE] Germany .......................... 39 24 144.0

[51] Int. Cl.$^6$ ................................ H04L 9/02; H04K 1/00
[52] U.S. Cl. .................................... 380/48; 380/33
[58] Field of Search ......................... 380/33, 48

[56] References Cited

U.S. PATENT DOCUMENTS

| | | |
|---|---|---|
| 3,886,313 | 5/1975 | Branscome et al. . |
| 4,401,854 | 8/1983 | Steele ........................................ 455/26 |
| 5,003,599 | 3/1991 | Landry ..................................... 380/48 |

*Primary Examiner*—Stephen C. Buczinski
*Attorney, Agent, or Firm*—Hill, Steadman & Simpson

[57] ABSTRACT

In the transmission of information which require secrecy, such as voice and data, serial bit streams having bit rates of more than 100 Mbit can occur, particularly given digital signal hierarchies according to the CCITT recommendations. In order to be able to utilize integrated circuits constructed in CMOS technology having low power consumption for the realization of cryptographic equipment for bit streams having such a high bit rate, it has already been proposed that a plurality of subcoders or, respectively, subdecoders be utilized upon employing multiplexing techniques. Given the utilization of subcoders and subdecoders having the same crypto-codes, a special synchronization between a demultiplexer and a multiplexer at the transmitting side, on the one hand, and at the receiving side, on the other hand, can be foregone given employment of individual synchronization of the subcoders and, respectively, subdecoders assigned to one another at the transmitting side and at the receiving side.

5 Claims, 3 Drawing Sheets

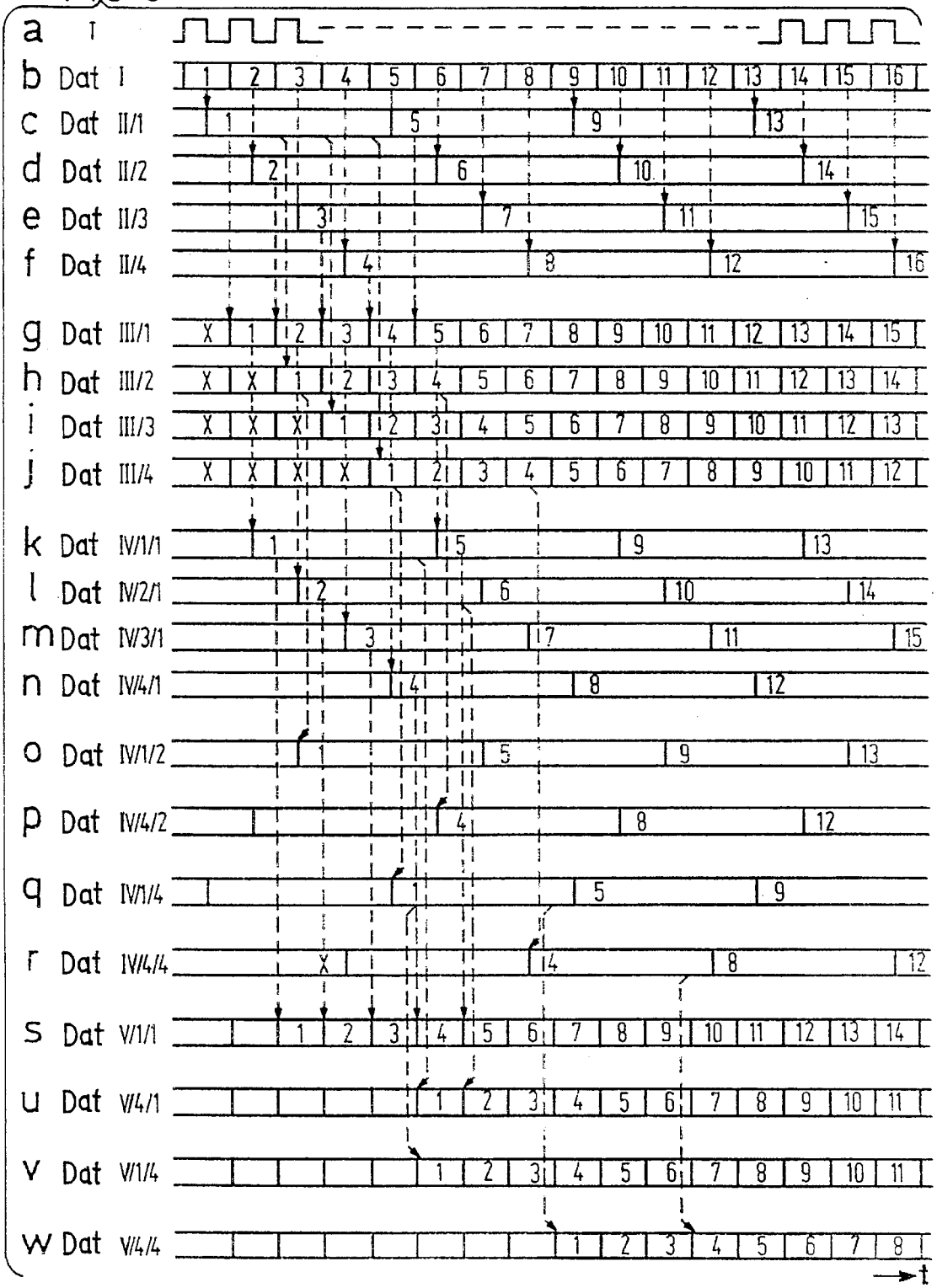

CRYPTOGRAPHIC EQUIPMENT

BACKGROUND OF THE INVENTION

1. Field of the Invention

The present invention relates to cryptographic equipment and is particularly concerned with cryptographic equipment composed of an encoder at the transmitting side and a decoder at the receiving side each respectively provided with a synchronization device for bit-by-bit encoding at the transmitting side and bit-by-bit decoding at the receiving side of a bit stream having a high bit repetition frequency and that represents a binary signal.

2. Description of the Prior Art

Cryptographic equipment of the type generally set forth above are particularly realized in mobile radio systems having integrated circuits in complementary metal-oxide-semiconductor (CMOS) technology since minimum dimensions given extraordinarily low power consumption of the required circuits are thereby achieved. However, the operating speed of such integrated circuits constructed in accordance with CMOS technology cannot be selected arbitrarily high. When, for example, bit streams on the order of magnitude of Mbit and above are to be encoded, then the operating speeds required for this purpose exceed the maximally-possible working speed of integrated circuits that can be executed in accordance with CMOS technology.

In order to alleviate this situation, it has already been proposed to design the encoder at the transmitting side with n subcoders and to design the decoder at the receiving side with n subdecoders that correspond to the subcoders, in particular in such a fashion that a demultiplexer that respectively divides the bit stream to the subcoders and subdecoders into n bit streams is thereby allocated at the input side to the n subcoders and subdecoders and a multiplexer that, in turn, combines the coded or, respectively, decoded bit substreams into the coded, or respectively, decoded bit stream is thereby respectively assigned to the n subcoders and subdecoders at the output side. The synchronization device for the encoder at the transmitting side and for the decoder at the receiving side is thereby then respectively designed for an individual synchronization of the n subcoders or, respectively, subdecoders assigned thereto.

Given the utilization of such encoders at the transmitting side and decoders at the receiving side, care must be exercised in order to guarantee an error-free transmission of the bit stream encoded in this manner to see that a frame synchronization with respect to the bit substreams is also present in addition to a faultless, mutual synchronization between the subcoders of the transmitting side and subdecoders of the receiving side that are assigned to one another. In a previous Obermaier et al patent application, Ser. No. 386,802, filed Jul. 27, 1989, this additional frame synchronization is accomplished by additional, mutual synchronization between the demultiplexer and the multiplexer both at the encoder of the transmitting side and at the decoder of the receiving side, this causing an additional expense. The disclosure of the aforesaid Obermaier et al application is hereby incorporated hereinto.

SUMMARY OF THE INVENTION

In a cryptographic equipment according to the aforementioned patent application, the object of the invention is to guarantee the frame synchronization despite foregoing a mutual synchronization of the demultiplexer and the multiplexer of the encoder of the transmitting side and the decoder of the receiving side and to therefore avoid the synchronization expense which is involved therewith.

According to the present invention, the above object is achieved, in cryptographic equipment of the type set forth above and which is particularly characterized in the frame synchronization of the bit stream representing the binary signal and to be encoded into n bit substreams at the transmitting side and to be decoded at the receiving side is guaranteed exclusively by synchronization of the n subcoders of the transmitting side and the n subdecoders at the receiving side in accordance with their mutual allocation in pairs, and in that, to this end, the n subcoders of the transmitting side and the n subdecoders of the receiving side employ the same cipher or, respectively, the same coder variable.

As appertaining investigations have shown, a mutual synchronization of the demultiplexer and the multiplexer of the encoder of the transmitting side, on the one hand, and of the decoder of the receiving side, on the other hand, can be foregone in an extremely advantageous manner when all subcoders and subdecoders may use of the same cipher and the individual synchronization between subcoders coders and subdecoders allocated to one another that is already known from the aforementioned patent application continues to be employed.

According to a particular feature of the invention, the cryptographic equipment is particularly characterized in that the n subcoders of the transmitting side and, correspondingly, the n subcoders of the receiving side are independent of one another with respect to the starting conditions of the cipher sequence that is respectively employed thereat.

According to another feature of the invention, the cryptographic equipment is particularly characterized in that, taking the phase relation of the multiplexer of the transmitting side into consideration, the synchronization of the n subcoders of the receiving side with the n subcoders of the transmitting side is undertaken in that, in response to a request at the receiving side, each of the n subcoders of the transmitting side transmits its own synchronization signal until the reception of these n synchronization signals is acknowledged at the transmitting side by the n subcoders of the receiving side.

According to another feature of the invention, the cryptographic equipment is particularly characterized in that the demultiplexer of the encoder of the transmitting side and of the decoder at the receiving side are each respectively composed of n D flip-flops whose signal inputs are parallel to one another and are supplied with the bit stream that has a high clock signal, in that further, a signal subclock lowered by the respective factor n in comparison to the high signal clock is applied to the clock input of each of the n D flip-flops and the n signal subclocks are thereby offset by one period of the high signal clock relative to one another, and in that one of the bit substreams to be encoded or, respectively, to be decoded is respectively applied at the same output of one of the n D flip-flops.

According to another feature of the invention, the cryptographic equipment is particularly characterized in that, for the encoding of a bit stream having a bit rate of 139.264 Mbit, the number n of, on the one hand, subcoders of the encoder at the transmitting side and, on the other hand, of the subdecoders of the decoder at the receiving side is four, and in that each subcoder or, respectively, subdecoder is designed for processing a bit rate of 34.816 Mbit.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 5 is a graphic illustration of a data pulse diagram, with respect to time for explaining the operation of the cryptographic equipment of the transmitting side or, respectively, of the receiving side.

DESCRIPTION OF THE PREFERRED EMBODIMENTS

Figure 1:
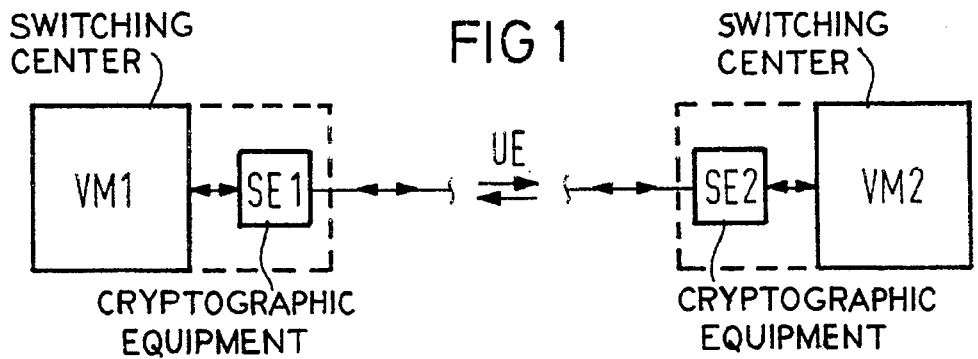
FIG. 1 is a block circuit diagram of a transmission link for the transmission of a binary signal in the form of an encoded bit stream having a high bit repetition frequency.

FIG. 1 is a schematic illustration of a transmission link UE that connects two switching centers VM1 and VM2 to one another. It is here assumed that this transmission link UE is designed for the transmission of a binary aggregate signal having a bit rate of 139.264 Mbit. This corresponds to the fourth data signal hierarchy level of a 30 channel basic system in accordance with the CCITT recommendations. The bit stream that represents this binary aggregate signal should be transmitted between the two switching centers in encoded form. To this end, the switching center via VM1 comprises a cryptographic equipment SE1 and the switching center VM2 comprises a cryptographic equipment SE2. The cryptographic equipment VM1, VM2 have the job of encoding the binary signal departing onto the transmission link UE and of decoding the binary signal incoming from the transmission link UE. A broken line respectively indicates the cryptographic equipment SE1 is a component of the switching center VM1 and that the cryptographic equipment SE2 is a component of the switching center VM2.

Figure 2:
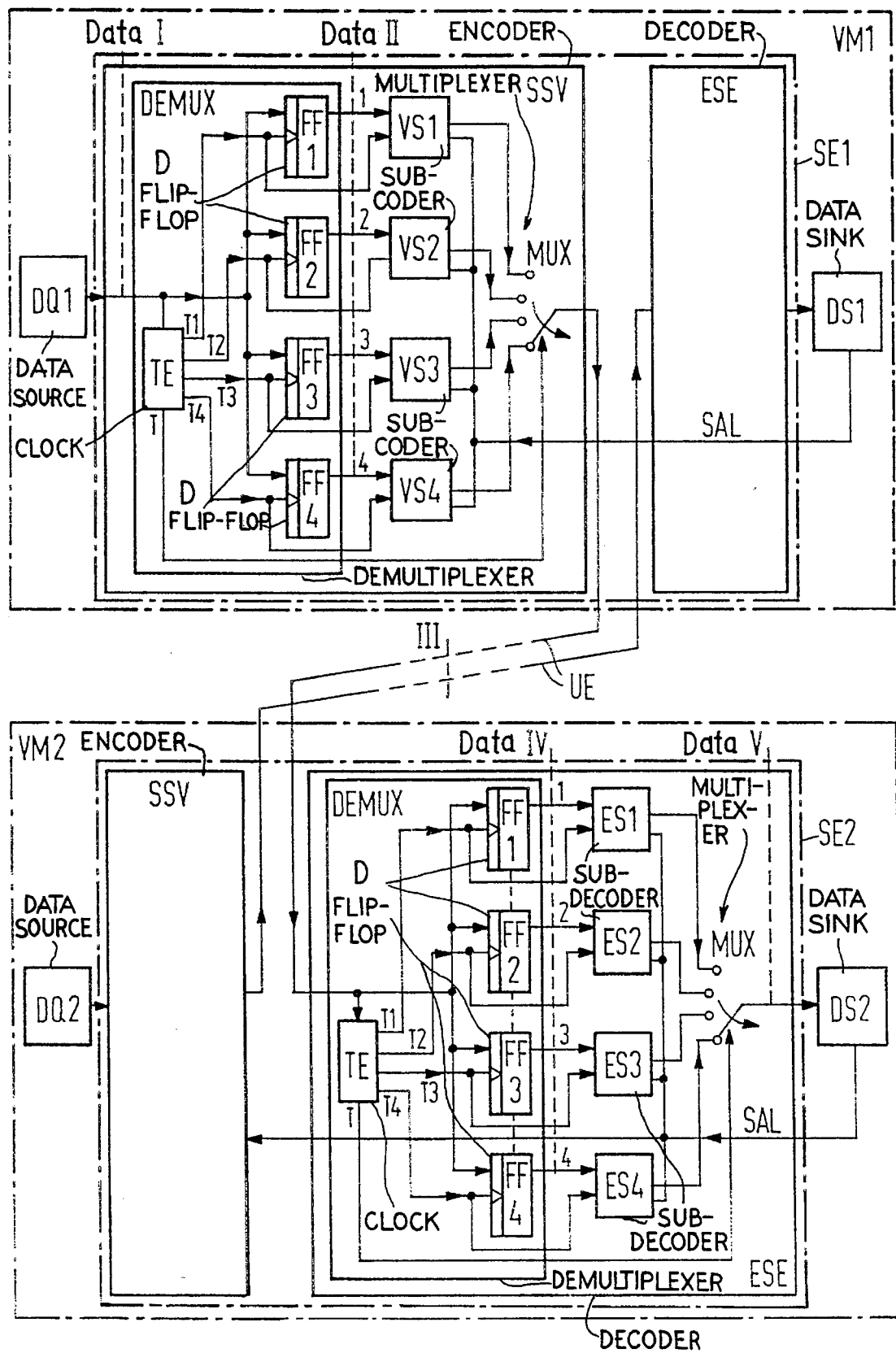
FIG. 2 is a schematic circuit diagram of a preferred embodiment of the cryptographic equipment in a transmission link of the type illustrated in FIG. 1 for the transmitting side or, for the receiving side.

FIG. 2 illustrates further details of the cryptographic equipment SE1 and SE2 of FIG. 1. The cryptographic equipment SE1 and SE2 that are constructed exactly identically are each composed of an encoder SSV of the transmitting side of the switching center VM1 and a decoder ESE of the switching center VM2 in greater detail in a block circuit diagram. At the input side of the encoder SSV, each of the two switching centers VM1 and VM2 comprises a data source DQ1 or, respectively, DQ2 and each comprises a data sink DS1 or, respectively, DS2 at the output side of the decoder ESE of the respective same cryptographic equipment SE1 or, respectively, SE2.

As the block diagram of the decoder SSV of the cryptographic equipment SE1 shows, the encoder at the transmitting side of a cryptographic equipment comprises a demultiplexer DMUX at its input side that divides the data I coming from the data source DQ1 into four identical bit substreams of data II/1, II/2, II/3, II/4 and supplies these in parallel to the input side of respective subcoders VS1, VS2, VS3 and VS4. The bit substreams encoded in the sub-coders are subsequently, in turn, combined in a multiplexer MUX into what is now an encoded bit stream referred to as the data III and the data III is transmitted via the transmission link UE to the remote switching center VM2 that is to be addressed as a transmitting/receiving station. As the block circuit diagram of the decoder ESE of the switching center VM2 shows, the decoders of both cryptographic equipment are correspondingly constructed. It differs from the encoder SSV only in that four subcoders ES1, ES2, ES3 and ES4 are provided here instead of the four subcoders.

Figure 3:
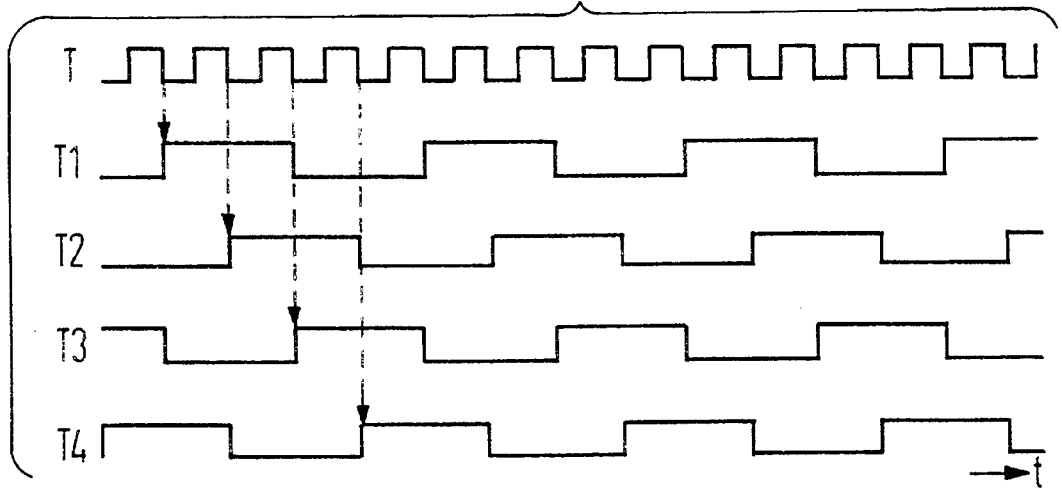
FIG. 3 is a pulse diagram of the clocks which may be employed in practicing the invention in the cryptographic equipment of the transmitting side or of the receiving side, the pulses being shown with respect to the time.

The multiplexer MUX at the encoder SSV and at the decoder DSE is merely indicated by a rotating switch that is controlled by the signal clock T of the clock generator TE. For its synchronization, the clock generator TE receives the Data I at the transmitting side and, at the receiving side, receives the encoded Data III with the signal clock T incoming on the transmission link UE. It derives four signal clocks T1, T2, T3 and T4 from the signal clock T, these being shown in the timing diagram of FIG. 3 together with the signal clock T.

Figure 4:
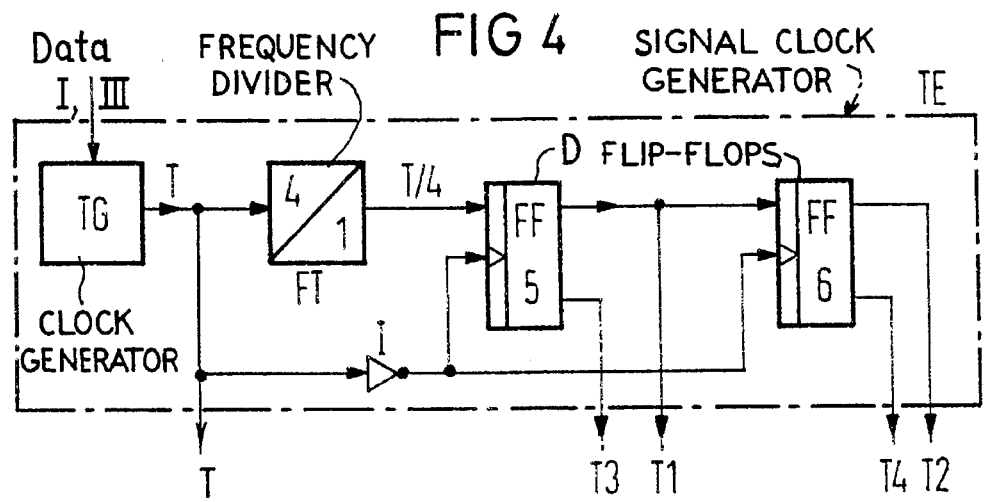
FIG. 4 is a schematic diagram of a preferred embodiment of a clock generator for the cryptographic equipment of FIG. 2 for the transmitting side or, respectively, for the receiving side.

A preferred embodiment of the clock generator TE of FIG. 2 is illustrated in FIG. 4. The clock generator TE comprises a basic clock generator TG whose signal clock T of the output side is synchronized by the bit stream that is to be encoded or, respectively, is encoded. The signal clock T of the basic clock generator TG is supplied to a frequency divider FT that has the division ratio 4/1. The signal clock T4 that is lowered by the factor 4 at the output side is then applied at the signal input of a first D flip-flop FF5, the clock generator TE also comprising a second D flip-flop FF6. The preparatory input signals of both D flip-flops FF5 and FF6 are supplied with the signal clock T via an inverter I. The signal subclocks T3 and T1 appear at the two outputs of the D flip-flop FF5. The signal sub-clock T1 is conducted to the signal input of the D flip-flop FF6 and the signal sub-clocks T2 and T4 are received at the two output thereof in this manner.

As FIG. 2 shows, in particular the block circuit diagrams of the encoder SSV of the switching center VM1 and of the decoder ESE of the switching center VM2, the demultiplexer DMUX is composed of four D-flip-flops FF1, FF2, FF3 and FF4 in addition to the clock generator TE. The uncoded Data I coming from the data source DQ1 or, respectively, the encoded Data III incoming via the transmission link Q3 are supplied in parallel to the signal inputs of all four D flip-flops. The signal subclock T1 is thereby made available to the D flip-flop F1, the signal subclock T2 is made available to the D flip-flop FF2, the signal subclock T3 is made available to the D flip-flop FF3, and the signal subclock T4 is made available to the D flip-flop FF4, being respectively made available to these flip-flops by the clock generator TE at their respective preparatory input terminals. The four bit substreams referred to as Data II/1, Data II/2, Data II/3 and Data II/4 at the outputs of the four D flip-flops FF1, FF2, FF3 and FF4 are, in turn, supplied to the inputs of the four subcoders VS1, VS2, VS3 and VS4. The bit sub-streams encoded in this manner are then combined into the encoded Data III via the multiplexer MUX that follows the subcoders and are then transmitted from the switching center VM1 to the switching center VM2 via the transmission link UE.

The bit sub-streams at the output of the demultiplexer DEMUX of the decoder ESE of the cryptographic equipment SE2, these bit sub-streams being referred to as Data IV/1, Data IV/2, Data IV/3 and Data IV/4 in FIG. 2, are now decoded in the subdecoders ES1, ES2, ES3 and ES4 assigned thereto, being decoded in the same manner as the uncoded bit streams at the encoder SSV of the cryptographic equipment SE1 and are combined to form the received, decoded bit stream referred to as Data V via the multiplexer MUX arranged at the output side of the subdecoders and are supplied to the data sink DS2 of the switching center VM2.

The subcoders VS1, VS2, VS3 and VS4, as well as the subdecoders ES1, ES2, ES3 and ES4 of the cryptographic equipment SE1 and SE2 all employ the same cipher or, respectively, the same code constant. This, however, does not mean that the subcoders of the transmitting side, on the one hand, and the subdecoders of the receiving side, on the other hand, must operate coupled in a phase-locked manner to one another. On the contrary, they are completely independent of one another. What is guaranteed by the randomization after the turn-on of the cryptographic equipment is that the initial conditions of the subcoders VS1, VS2, VS3 and VS4 of the coder SSV and of each cryptographic equipment SE1 and SE2 are different.

The faultless reconstruction of the Data I transmitted in encoded form via the transmission link UE requires the synchronization of the cryptographic equipment SE1 of the switching center VM1 at the transmitting side with the cryptographic equipment SE2 of the remote switching center VM2. This synchronization is respectively limited to the synchronization of a subdoder of the transmitting side with the subdecoder assigned thereto at the receiving side. The allocation is thereby not rigidly prescribed because, according to the present invention, a mutual synchronization of the demultiplexer DEMUX and the multiplexer MUX of the encoder SSV of the transmitting side and of the decoder ESE of the receiving side is not undertaken.

At the beginning of the desired transmission, a synchronization request signal is transmitted from the data sink DS2 of the remote switching station VM2 via the encoder SSV thereof to the encoder SSV of the cryptographic equipment SE1 of the switching center VM1. To this end, the data sink DS2 comprises a synchronization request signaling line SAL by way of which it is in communication, among other things, with the subcoders of the encoder SSV of its own cryptographic equipment. The analogous case applies to the data sink DS1 of the cryptographic equipment SE1 of the switching center VM1. The subcoders VS1, VS2, VS3 and VS4 of the encoder SSV of the switching center VM2 each respectively send a synchronization request signal via the transmission link UE to the cryptographic equipment SE1 of the switching center VM1 which, in response thereto, initiates the subcoders VS1, VS2, VS3 and VS4 of the encoder SSV of the switching center to output a synchronization signal that is specific for every subcoder. As soon as all subdecoders ES1, ES2, ES3 and ES4 of the decoder ESE of the cryptographic equipment ES2 of the switching center VM2 have received the synchronization signal assigned thereto and this has been acknowledged from the switching center VM2 to the switching center VM1, the desired data transmission can be carried out. When an error occurs in the transmission, then the data sink DS2 at the switching center VM2 initiates a re-synchronization in the manner already set forth.

As shall yet be set forth in greater detail with reference to the data diagrams of FIG. 5 shown over the time t, a frame synchronization of the bit sub-streams can be foregone through this type of synchronization.

First of all, the line a shows the signal clock T that corresponds to the bit rate of the Data I to be transmitted in encoded form. The Data I are recited in the line b for 16 bits 1–16. The Data II/1, the Data II/2, the Data II/3 and the Data II/4 are shown by their diagram lines c, d, e and f, respectively. Each of these bit sub-streams now has only every fourth bit of the Data I of the diagram line b with four times the length of an original data bit. The Data II/1–II/4 acquired in this manner are now processed in the following subcoders VS1, VS2, VS3 and VS4 with respectively one-fourth of the bit rate of the signal clock T. The reconversion of the four parallel bit sub-streams of Data II/1–II/4 into a serial bit sequence for the recovery of the original bit stream in what is now encoded form occurs in the multiplexer MUX that follows the subcoders. The multiplexer MUX shown as a rotary switch rotates with the frequency of the signal clock T and thus successively queries the parallel bit sub-streams. The encoded bit stream referred to as Data III can have four different time slots of its frame dependent on the arbitrary switching phase of the rotating switch, these being referenced in FIG. 5 in the diagram lines g, h, i and j as Data III/1, Data III/2, Data III/3 and Data III/4. Which of these four encoded bit streams is output as a multiplexed signal at the output of the multiplexer MUX is only dependent on the random switching phase of the multiplexer relative to the phase relation of the signal sub-clocks T1, T2, T3 and T4. As the diagram line g, h, i and j show, the sequence of the bits of the Data I in accordance with the diagram line b is preserved in all four encoded bit streams. The four encoded bit streams differ from one another merely on the basis of a mutual time delay of one through four bits.

In order to be able to in turn decode the encoded bit stream referred to as the Data III after its transmission via the transmission link UE to the switching center VM2, a series-to-parallel conversion corresponding to the transmitting side must likewise be undertaken at the receiving side. To this end, the Data III are supplied to the demultiplexer DEMUX of the decoder ESE at the switching center VM2. Corresponding to the four possible time slots of the encoded bit stream according to the diagram lines g, i and j for the data that have been converted into parallel in the four encoded bit sub-streams, the Data IV. When the bit streams transmitted encoded are the Data III/1 corresponding to the diagram line g, the encoded bit sub-streams Data IV/l/1, Data IV/2/1, Data IV/3/1 and Data IV/4/1 set forth in the diagram lines k, l, m and n, respectively, derive. The diagram lines o and p indicate two of the encoded bit sub-streams for that case in which the encoded bit stream was transmitted in the time slot of the Data III/3/2 corresponding to the diagram line h. These two encoded bit sub-streams, Data IV/1/2 and Data IV/2/2, are set forth in the diagram line o and p. The bit sub-streams, the Data IV/1/4 and Data IV/4/4 shown in the diagram lines q and r derive given the transmission of the encoded bit stream in the time slot of the Data III/4 corresponding to the diagram line j. Encoded, binary bit sub-streams obtained in this manner are now decoded with a low bit rate in the following subdecoders ES1, ES2, ES3 and ES4 and are converted back into the decoded binary stream Data V with the multiplexer MUX that is again shown as a rotating switch. Dependent on the switch phase of the multiplexer MUX, four different, phase-shifted decoded binary streams Data V, can thereby again result, whereby however, the original bit sequence (1, 2, 3, 4 . . . ) is preserved.

When the bit sub-streams corresponding to the diagram lines k, l, m and n are applied at the multiplexer MUX via the subdecoders ES1, ES2, ES3 and ES4, then, corresponding to the diagram line s, the decoded binary stream, Data V/1/1, results for a given switch phase of the multiplexer MUX. A switch phase of the multiplexer MUX differing by three switch steps from the aforementioned switch phase yields the decoded binary sequence, Data V/4/1 corresponding to the diagram line u. Further decoded binary streams Data V/1/4 and Data V/4/4 are set forth in the diagram lines d and w.

As a comparison for possible, decoded binary sequences of Data V shows, all possible decoded binary streams, Data V, are identical to one another, but have the phase shift of up to seven bits relative to one another dependent on the switching phase of the multiplexer MUX of the encoder SSV of the transmitting side and the decoder ESE of the receiving side. An arbitrary allocation of switch steps between the multiplexer and the demultiplexer at the transmitting side and at the receiving side, as well as altogether, therefore does not change the transmitting-side sequence of the serial data of the bit stream to be transmitted, even after a two-times series-to-parallel-to-series conversion at the receiving side.

Although I have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Crypto equipment constructed in accordance with CMOS technology, comprising:

an encoder device at a transmitting side and a decoder device at a receiving side for bit-by-bit encoding and decoding of a bit stream having a high bit rate representing a binary signal;

said encoder device comprising n encoders and said decoding device comprising n decoders;

a first demultiplexer for receiving the bit stream connected to n decoders for dividing the bit stream into n bit streams;

a first multiplexer connected to said n encoders for combining the encoded bit streams for transmission;

a second demultiplexer for receiving the encoded bit stream, said second demultiplexer being connected to said n decoders and operating to divide the encoded bit stream into n encoder bit streams;

a second multiplexer connected to said n decoders for combining the n decoder bit streams; and synchronization means at the transmitting end receiving sides connected to said n encoders and n decoders for individual, synchronization thereof;

said synchronizing means including first means at said receiving station operable to activate said decoders of said receiving station to transmit a synchronization request signal to said transmitting station;

second means in said transmitting station for receiving the synchronization request signal and activating said encoders thereof to transmit a synchronization signal that is specific for each encoder, and which can be received and decoded by said decoders of said receiving station;

said n encoders of said transmitting station and said n decoders of said receiving station allocated to one another in pairs and said n encoders of said transmitting station and said n decoders of said receiving station employing the same cipher, whereby frame synchronization is achieved by means of said synchronization request signal.

2. The improved cryptographic equipment of claim 1, wherein:

said n subcoders at said transmitting station and said n subcoders at said receiving station include means for operating independently of one another with respect to the starting conditions of the cipher sequence respectively employed thereat.

3. The improved cryptographic equipment of claim 2, wherein:

taking the phase relation of said encoded bit stream of said transmitting station into consideration, the synchronization of said n subdecoders of said receiving station with n subcoders of said transmitting station occurs in response to a request at said receiving station, each of said n subcoders of said transmitting station comprising means operable to transmit its own synchronization signal until the reception of the n synchronization signals is acknowledged at said transmitting station by said n decoders of said receiving station.

4. The improved cryptographic equipment of claim 3, wherein:

said demultiplexer of said encoder at said transmitting station and said demultiplexer of said decoder at said receiving station each comprise n D flip-flops comprising individual signal inputs in parallel with one another for receiving the bit stream having the high bit repetition frequency;

a clock generator producing a plurality of sub-clocks from the high bit repetition frequency, said sub-clocks lowered by the respective factor n in comparison to the high signal clock represented by the high bit repetition frequency, each of said flip-flops including a clock input for receiving a respective sub-clock, the sub-clocks being offset by one period of the high signal clock relative to one another, each of said D flip-flops comprising an output for producing a respective one of the n bit sub-streams to be encoded or, respectively, decoded.

5. The improved cryptographic equipment of claim 4, wherein:

for the encoding of a bit stream having a bit rate of 139.264 Mbit, the number n of subcoders at said transmitting station and subdecoders at said receiving station is four; and each subcoder and each subdecoder comprise means for operating at a bit rate of 34.816 Mbit.

* * * * *